United States Patent
Dehlke et al.

(10) Patent No.: US 7,458,244 B2
(45) Date of Patent: Dec. 2, 2008

(54) FEEDING UNIT AND METHOD FOR FEEDING AN ELEMENT TO A TREATMENT UNIT

(75) Inventors: Klaus Dehlke, Windsbach (DE); Christian Böhner, Burghaslach (DE); Gerd Hartrampf, Abenberg (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 0 days.

(21) Appl. No.: 11/820,146

(22) Filed: Jun. 18, 2007

(65) Prior Publication Data

US 2007/0295169 A1    Dec. 27, 2007

Related U.S. Application Data

(63) Continuation of application No. PCT/EP2005/010211, filed on Sep. 21, 2005.

(30) Foreign Application Priority Data

Dec. 16, 2004   (DE) .................. 10 2004 061 164
May 13, 2005    (DE) .................. 10 2005 023 099

(51) Int. Cl.
   *B23Q 17/00* (2006.01)
   *B23P 21/00* (2006.01)
   *B21J 15/02* (2006.01)

(52) U.S. Cl. ............. 72/391.6; 29/812.5; 29/525.06; 29/407.01; 29/243.523; 227/2; 227/51

(58) Field of Classification Search ............ 227/2, 227/51, 52, 53; 72/391.6, 453.17; 29/243.521–243.529, 29/243.53, 812.5, 407.01, 535.06
See application file for complete search history.

(56) References Cited

U.S. PATENT DOCUMENTS

| | | | | |
|---|---|---|---|---|
| 3,580,457 | A | * | 5/1971 | Henshaw ............... 29/243.523 |
| 3,658,230 | A | * | 4/1972 | Enock ................... 227/51 |
| 4,205,547 | A | * | 6/1980 | Yamasaka ............... 29/812.5 |
| 4,604,889 | A | * | 8/1986 | Sukharevsky ........... 29/243.525 |
| 4,747,294 | A | * | 5/1988 | Schwartz et al. ........ 227/51 |
| 4,754,643 | A |   | 7/1988 | Weeks, Jr. et al. |

(Continued)

FOREIGN PATENT DOCUMENTS

CH        563 841        7/1975

(Continued)

OTHER PUBLICATIONS

Solaris, "Stepper Motor Definition", 2008, Solarisnetwork.com and Wikipedia.*

*Primary Examiner*—David B Jones
(74) *Attorney, Agent, or Firm*—Laurence A. Greenberg; Werner H. Stemer; Ralph E. Locher

(57) ABSTRACT

A feeding unit for feeding an element to a treatment unit of a machine tool, in particular for feeding a rivet to a riveting unit, has a gripping element provided for the fastening element for the automatic take-up of the fastening element from a supply unit and automatic feed to the treatment unit. The gripping element is disposed on a rotary element rotatable about an axial direction, and at least one electromagnet is provided which is configured in such a way that a torque acting on the rotary element is generated by a magnetic force.

12 Claims, 4 Drawing Sheets

U.S. PATENT DOCUMENTS

| | | | |
|---|---|---|---|
| 4,815,343 A | | 3/1989 | Sofinowski |
| 4,972,985 A | * | 11/1990 | Smart et al. .................... 227/2 |
| 5,009,354 A | * | 4/1991 | D'Aquila et al. ............... 227/2 |
| 5,036,576 A | * | 8/1991 | Gast ........................ 29/407.01 |
| 5,199,624 A | * | 4/1993 | Smart et al. .................... 227/2 |
| 5,327,639 A | * | 7/1994 | Wing et al. ................ 29/812.5 |
| 6,240,613 B1 | * | 6/2001 | O'Connor et al. ...... 29/243.523 |
| 6,347,449 B1 | * | 2/2002 | Calkins et al. ........... 29/243.53 |

FOREIGN PATENT DOCUMENTS

| | | |
|---|---|---|
| DE | 43 35 668 A1 | 4/1995 |
| EP | 0 284 251 A2 | 9/1988 |
| EP | 0 496 499 A1 | 7/1992 |

\* cited by examiner

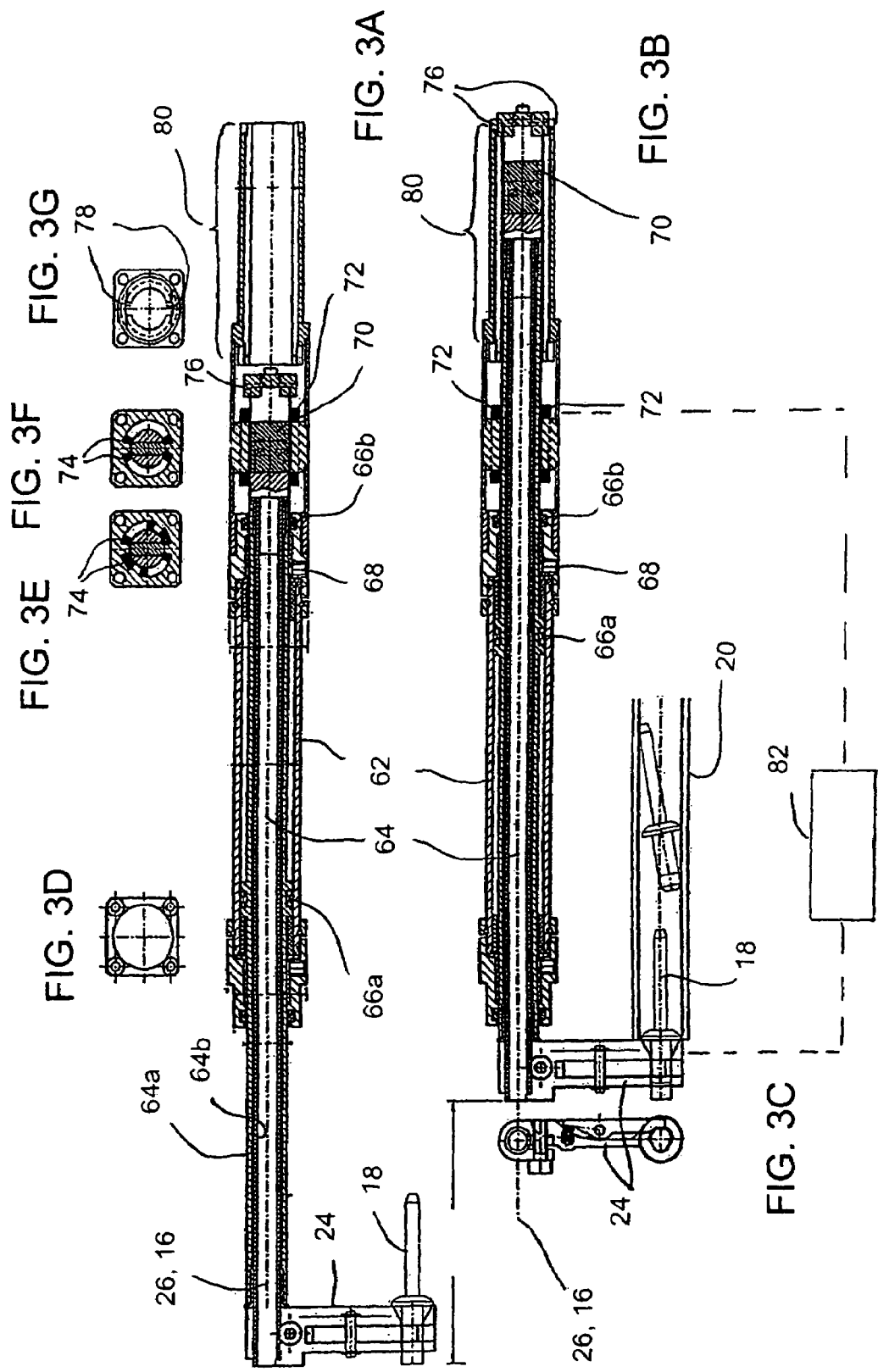

FEEDING UNIT AND METHOD FOR FEEDING AN ELEMENT TO A TREATMENT UNIT

CROSS-REFERENCE TO RELATED APPLICATIONS

This is a continuing application, under 35 U.S.C. § 120, of copending international application No. PCT/EP2005/010211, filed Sep. 21, 2005, which designated the United States; this application also claims the priority, under 35 U.S.C. § 119, of German patent application Nos. DE 10 2004 061 164.5, filed Dec. 16, 2004, and DE 10 2005 023 099.7, filed May 13, 2005; the prior applications are herewith incorporated by reference in their entirety.

BACKGROUND OF THE INVENTION

Field of the Invention:

The invention relates to a feeding unit and to a method for feeding an element to a treatment unit of a machine tool.

In the automated treatment of an element, for example a component or a joining element, in particular with the aid of a robot, an automated and individual feeding of the individual elements to the treatment unit is required. The joining elements are in this case, for example, screws, nuts, fastening bolts, and also rivets, in particular blind rivets and blind rivet nuts.

A treatment unit is therefore understood here, generally, to mean a unit by which a component or joining element is introduced or attached in or on a workpiece at an intended position. The treatment unit is in this case, in particular, a setting unit by which a rivet is inserted into the workpiece. The treatment unit may also be a screwing unit for screwing a screw element into the workpiece or a punching unit for shooting a bolt into a workpiece. The machine tool having the treatment unit is therefore, in particular, a plug-in, press-in, punching, screwing, riveting or blind-riveting tool.

To attach the element to the workpiece, an advancing movement of the treatment unit with respect to the workpiece is normally required. So as not to disturb the treatment operation, therefore, the feeding unit should lie outside the treatment plane spanned by the workpiece. For good access even to confined installation spaces, for example in a motor vehicle, the feeding unit should have as small a build as possible, so as not to impede the freedom of movement of, for example, a robot hand, having the treatment unit, of an industrial robot. Furthermore, the feeding unit must ensure a rapid feed of the element to the treatment unit, in order to achieve as short cycle times as possible.

In the connection of two components by blind rivets, for example, a riveting unit is used, in which the blind rivet to be set is first fed manually from the front to a mouthpiece of the riveting unit. Subsequently, the riveting unit, with the blind rivet in front, is introduced into a through bore (rivet hole) of the components to be connected, and the blind rivet is set. A blind rivet residual plug torn off during the setting operation is usually collected in a collecting container of the riveting unit which is disposed in the axial direction at the rear end of the riveting unit.

Blind rivet technology is increasingly employed, particularly also in the motor vehicle sector, for the connection of components which have hitherto been connected to one another, for example, by welding. Motor vehicle manufacturing is automated to a high degree, and the connection of the body components is for the most part carried out with the aid of welding robots which automatically approach the welding points and weld the components to one another automatically.

For the automated operation of setting a blind rivet with the aid of an industrial robot, an automated feed of the blind rivets to the riveting unit is required. In order to allow as short cycle rates as possible, a rapid feed is in this case necessary.

SUMMARY OF THE INVENTION

It is accordingly an object of the invention to provide a feeding unit and a method for feeding an element to a treatment unit which overcomes the herein-mentioned disadvantages of the heretofore-known devices and methods of this general type, which makes it possible to have a rapid automatic feed of a component or a joining element to a treatment unit.

With the foregoing and other objects in view there is provided, in accordance with the invention, a feeding unit for feeding an element to a treatment unit of a machine tool. The feeding unit includes a rotary element rotatable about an axial direction and a gripping element for automatically taking-up of the element being a fastening element from a supply unit and automatically feeding the treatment unit. The gripping element is disposed on the rotary element rotatable about an axial direction. At least one electromagnet is provided for generating a magnetic force for producing a torque acting on the rotary element.

The object is achieved, according to the invention, by a feeding unit which has a gripping element for the component or joining element, designated generally as an element, for the automatic take-up of the element from a supply unit and for automatic feed to the treatment unit, in particular setting unit. The gripping element is in this case disposed on a rotary element rotatable about an axial direction, an electromagnet being provided which is configured in such a way that a torque acting on the rotary element is generated by a magnetic force. In order to take up the element automatically from the supply unit, the feeding unit preferably has a catching element, into which the element is inserted, in particular shot.

By use of a feeding unit of this type, a fully automatic treatment operation for fastening the element to a workpiece becomes possible. Particularly in the configuration as a rivet setting tool for setting a blind rivet, the hitherto manually executed equipping of a mouthpiece of the treatment unit configured as a riveting unit is automated by the feeding unit. Since the need for manual actuation is dispensed with, costs are thereby saved. Moreover, the automated setting operation also allows improved process monitoring, since the work sequences of an industrial robot are preferably monitored automatically. There is no risk of deliberate or inadvertent maloperation during the setting operation by the operating personnel.

A particular advantage of the configuration is that a magnetic force is exerted directly on the rotary element. There is no mechanical force transmission via a gear or the like. This has the particular advantage that the rotational movement can, on the one hand, take place with very low wear and, on the other hand, can also occur very quickly, as compared with a mechanical gear, so that low cycle rates can be achieved. A cycle rate is understood in this context to mean the time span between two setting operations. A further particular advantage of the magnetic drive is that, if the rotary element or the gripping element is impeded by an obstacle, they simply stop. Contrary to a mechanical positive drive, therefore, no mechanical forces which can cause damage arise here. Expediently, in this case, the rotary element is configured in the manner of a rod or of an elongate element. In particular, the rotary element is a rotor of a drive configured in the manner of an electric motor.

The preferred developments listed below are explained in connection with the setting of a blind rivet. These developments, however, also apply equally to feeding units for other elements.

Preferably, the rotary element is rotatable between at least two defined angular positions. The two angular positions correspond to the rotary position, on the one hand, for the take-over of the blind rivet from the feeding unit configured as a rivet feed and, on the other hand, for the transfer of the blind rivet to the mouthpiece. The angular positions are in this case defined by the arrangement of the magnetic poles. A reversal of the respective poles therefore leads to the rotary element rotating from one angular position into the other angular position. There is therefore no need for any mechanical stops or stopping elements. On the contrary, the magnetic drive is already configured in such a way that the rotary element comes to a stop in predefined angular positions.

Preferably, a third defined angular position is provided, which corresponds to the rotary position for a take-over of a residual plug from the setting unit. The configuration is based on the consideration, according to which the residual plug is also taken up from the setting unit again with the aid of the feeding unit and is transferred to a residual plug discharge unit, for example a collecting container.

To form the magnetic drive, the magnetic poles are disposed so as to be distributed around the circumference of the rotary element. Expediently, in this case, the poles of a permanent magnet are disposed on the rotary element and the poles of an electromagnet, which can be reversed in a simple way, are disposed around the rotary element. Since the poles of the electromagnet are disposed statically, power supply can be ensured here without difficulty.

In general, the use of permanent magnets has the particular advantage that, due to the magnetization of the rotary element, a permanent magnetic force acts on the latter, even with the electromagnet switched off, and holds the rotary element in a defined rotary position or moves the rotary element automatically into this. The magnetic holding force thereby caused is preferably set in such a way that, in all operating situations, the rotary element is held in a defined rotary position and consequently in a defined location, without locking elements, solely by the magnetic force.

With a view to a compact configuration, the rotary element is preferably at the same time also displaceable in the axial direction. The rotary element is therefore capable of executing a superposed movement both in the axial direction and in the direction of rotation.

For this purpose, according to an expedient development, the rotary element is guided telescopically in a guide tube which is configured particularly as a pneumatic cylinder. In this case, in particular, the poles of the electromagnet are disposed within the guide tube. This achieves, overall, a simple and compact construction.

A pneumatic drive is preferably provided for movement in the axial direction. In this case, in particular, corresponding pneumatic connections, valves and the like are provided on the guide tube. Expediently, the rotary element mounted axially in the guide tube is acted upon directly with pressure. The rotary element is sealed off within the guide tube with respect to the latter in order to allow a pressure build-up.

According to an expedient configuration, the rotary element is configured as a double tube with an outer tube and with an inner tube or inner shaft. Overall, the rotary element is expediently configured in the manner of a hollow piston rod. The double tube configuration affords the particular advantage that the axial or translational movement can be decoupled from the rotary or rotational movement. Particularly in the variant with action upon the rotary element with compressed air for axial displacement, therefore, the outer tube merely needs to be sealed off with respect to the guide tube in the manner of a pneumatic cylinder. The outer tube here executes only an axial movement on which no rotational movement is superposed. The rotational movement is carried out solely via the inner tube on which the torque generated by the electromagnet therefore acts.

In a preferred embodiment, the guide tube has in a rear region an axial positive guide for the rotary element, so that a rotational movement of the latter is prevented. During the axial displacement of the rotary element, the latter moves out of a retracted position into a front rotary position in which the rotational movement then takes place. This configuration ensures that the rotational movement can take place only from a defined axial position and that the mouthpiece of the riveting unit is not damaged, for example, as a result of too early a rotational movement. Moreover, with a view to as short cycle times as possible, the positive guide affords the possibility of activating the magnetic drive at an early stage when the rotary element is still in the retracted position. For axial positive guidance, a groove-and-tongue guide is preferably formed between the rotary element and the guide sleeve.

To activate the magnetic drive, a control unit is provided. This activates the magnetic drive particularly even when the rivet feeding unit receives a blind rivet from the rivet feed. At this time point, the rotary element is still in its retracted position, since, in this position, the blind rivet is transferred from the rivet feed to the rivet feeding unit.

Furthermore, the object is achieved, according to the invention, by a method for feeding an element to a treatment unit. The advantages and preferred embodiments listed in terms of the feeding unit can also be transferred equally to the method.

Other features which are considered as characteristic for the invention are set forth in the appended claims.

Although the invention is illustrated and described herein as embodied in a feeding unit and a method for feeding an element to a treatment unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3A is a diagrammatic, sectional view of a rivet feeding unit with an extended gripping element;

FIG. 3B is a diagrammatic, sectional view of the rivet feeding unit with a retracted gripping element;

FIG. 3C is a diagrammatic, front view of the gripping element;

FIGS. 3D-3G are diagrammatic, sectional views through the rivet feeding unit in different longitudinal positions.

DETAILED DESCRIPTION OF THE INVENTION

Figure 1:
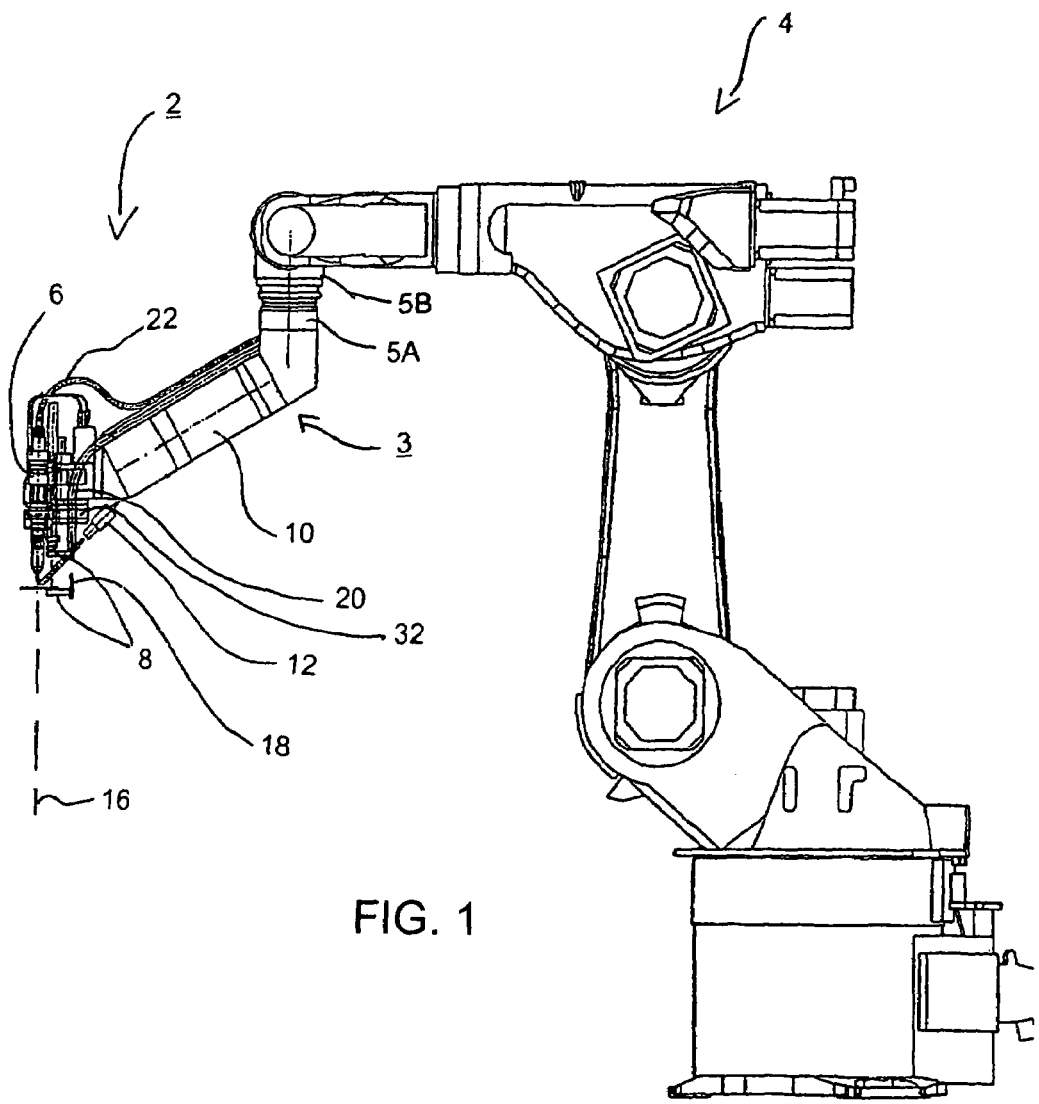
FIG. 1 is a diagrammatic, side view of an industrial robot, a robot hand of which is formed by a blind rivet setting device according to the invention.

Identically acting parts are given the same reference symbols in the figures. Referring now to the figures of the drawing in detail and first, particularly, to FIG. 1 thereof, there is shown a blind rivet setting device 2, being an angled robot arm 3, and is disposed as a machine tool on a multiaxial industrial robot 4. The setting device 2 is in this case fastened exchangeably via flanges 5A, 5B to what is known as a sixth axis of the six-axis industrial robot 4. The setting device 2 contains a setting or riveting unit 6, a rivet feeding unit 8, a hydraulic unit 10 and a hole detection unit 12. In the configuration variant according to FIG. 2, a repositioning unit 14 for the fine positioning of the riveting unit 6 within an X-Y plane, which spans perpendicularly to an axial direction 16, is additionally provided. The setting device 2 is, overall, a mechanically rigid structure. Only the riveting unit 6 is disposed movably within certain limits. The industrial robot 4 with the setting device 2 is suitable for the fully automatic setting of a blind rivet 18. To feed the blind rivet 18 to the rivet feeding unit 8 according to FIG. 1, a hose is provided as a supply unit 20 for the supply and feed of the rivets 18. Blind rivets 18 are individually shot in pneumatically via the hose, for example from a separating station, not illustrated in any more detail here. Furthermore, in the exemplary embodiment, the riveting unit 6 is connected on its rear side to a further hose which is part of a residual plug discharge unit 22 and via which a residual plug occurring during the setting operation is sucked away.

For the automatic setting operation, the blind rivet 18 is first fed via the supply unit 20 to a gripping element 24 of the rivet feeding unit 8 and is caught by the gripping element 24. The gripping element 24 is therefore configured particularly as a catching element and has a conical introduction funnel for the blind rivet 18. In the gripping element 24, the blind rivet is secured, for example by a magnetic or mechanical holding force, against falling out. The gripping element 24 is subsequently moved forward in the axial direction 16, and subsequently a rotational movement takes place about an. axis of rotation 26 oriented parallel to the axial direction 16, so that the blind rivet 18 is positioned in front of a mouthpiece 28 of the riveting unit 6. Thereafter, the gripping element 24 is displaced back in the axial direction 16 again, and the blind rivet 18 is introduced, with its rivet plug in front, into the mouthpiece 28. The gripping element 24 is then rotated away again, and the riveting unit 6 is advanced in the axial direction 16 to a workpiece 30, illustrated here diagrammatically merely as a line. In this case, the blind rivet 18 is inserted, with its shank in front, into a rivet hole 29 (cf. FIG. 3) which is configured as a through bore through at least two workpieces 30 to be connected. The blind rivet 18 is inserted until it lies with its setting head on a workpiece surface. Subsequently, the rivet plug located in the mouthpiece 28 and firmly surrounded by the riveting unit 6 is drawn to the rear in the axial direction 16 with the aid of a hydraulic drive. For this purpose, the riveting unit 6 is connected to the hydraulic unit 10 by hydraulic lines, not illustrated in any more detail here. In this case, a closing head is formed on that side of the blind rivet 18 which faces away from the setting head, so that the two workpieces 30 are firmly connected to one another. As soon as a predetermined tensile force is overshot, the rivet plug tears off and is sucked away as a residual plug via the residual plug discharge unit 22. Thereafter, the riveting unit 6 moves back again and is moved by the industrial robot 4 onto the next learnt desired position, in order to carry out the next setting operation.

Figure 2:
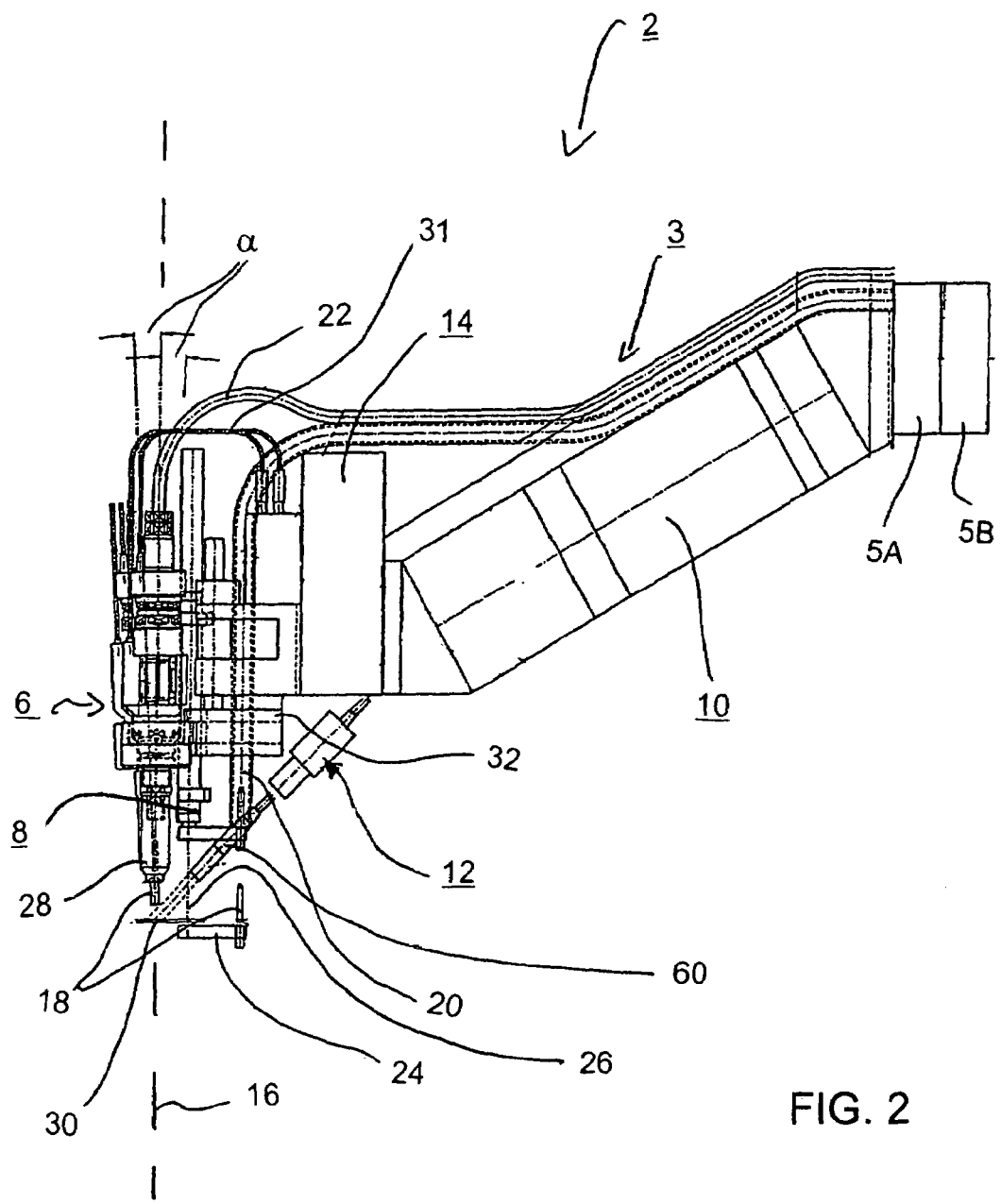
FIG. 2 is a diagrammatic, lateral view of a second embodiment of a blind rivet setting device.

Furthermore, FIGS. 1 and 2 illustrate a combined laser/camera unit 60 which, oriented obliquely to the axial direction 16, is fastened to the setting unit 2 in a way not illustrated in any more detail here. The unit 60 is part of the hole detection unit 12 and has as a light source a laser and also an optical camera, which are not illustrated in detail here.

The construction of the rivet feeding unit 8 and its functioning are explained in more detail below with reference to FIGS. 3A to 3H. As may be gathered from FIG. 3A and 3B, the rivet feeding unit 8 contains an outer guide tube 62 which is configured as a pneumatic cylinder and in which a hollow piston rod 64 configured as a rotary element is displaceably held and guided telescopically in the axial direction 16. The hollow piston rod 64 is configured as a double tube with an outer tube 64a and with an inner tube 64b. The gripping element 24 is disposed at the front end of the inner tube 64b. The hollow piston rod 64 is sealed off with respect to the guide tube 62 via a front piston seal 66a, configured as a piston ring, and a rear sliding seal 66b. In the space between these two seals, 66a, 66b, in the region of the rear sliding seal 66b, a pneumatic drive is provided for displacing the hollow piston rod 64 within the guide tube 62 in the axial direction 16. For this purpose, a connection 68, via which a pneumatic line can be connected, is arranged.

A magnetic drive is provided for executing a rotational movement. To form this magnetic drive, a permanent magnet 70 is disposed at the rear end of the inner tube 64b. A plurality of magnet coils 72 are suitably arranged, held fixedly on the guide tube 62, around the inner tube 64b, so that a plurality of electromagnetic poles 74 are formed around the circumference of the inner tube 64b and can be reversed, as required (cf., in this respect, particularly FIGS. 3E, 3F and 3H). The inner tube 64b may therefore be considered as a rotor of an electric motor.

In the double tube configuration, described here, of the hollow piston rod, a decoupling of the rotational movement from the axial movement is advantageously achieved. Alternatively to this, the hollow piston rod may basically also be configured as a single tube or single shaft.

Figure 3H:
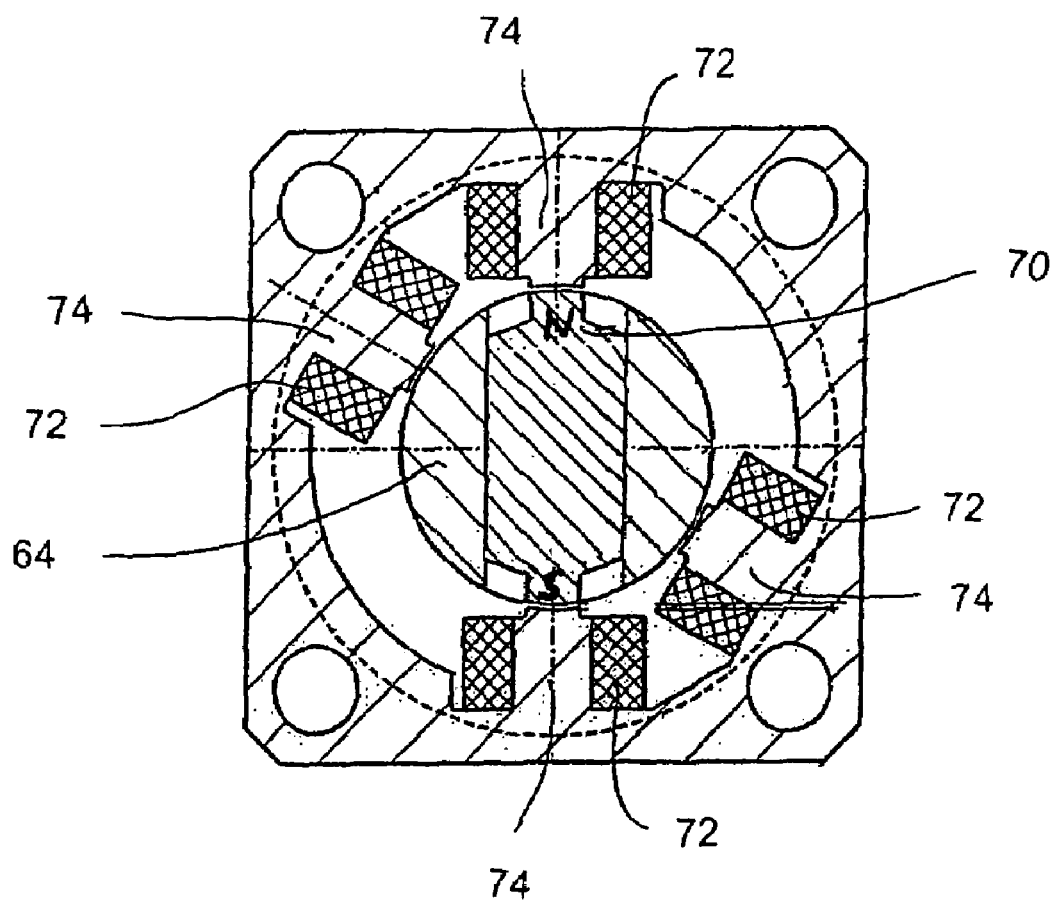
FIG. 3H is a diagrammatic, enlarged sectional view through the rivet feeding unit in the region of an electromagnet.

In the design variant illustrated in FIG. 3H, overall, four electromagnetic poles 74 are provided, in each case two poles 74 being disposed, offset at 180°, opposite one another. This configuration of the poles 74 disposed so as to be offset to one another defines fixed angular positions. By a suitable activation of the magnet coils 72, therefore, there is the possibility of bringing the inner tube 64b into a desired defined angular position. The inner tube 64b and consequently the gripping element 24 are therefore brought in each case into the desired firmly defined rotary position either for taking over the blind rivet 18 from the rivet feed 20 or for transferring the blind rivet 8 into the mouthpiece 28.

As may be gathered from FIG. 3H, the permanent magnet 70 is inserted into a slot of the hollow piston rod 64 and therefore penetrates through the latter. In the region of its poles, the permanent magnet has in each case a nose or a projection. Correspondingly to this, the core of the electromagnets 74 is also provided with a corresponding projection. By virtue of this configuration, only a very small gap is achieved in this region, so that the magnetic flux is as far as possible uninterrupted.

Moreover, due to the contraction in this region, a high magnetic flux density prevails, so that a high magnetic holding force is achieved in the defined angular position. This holding force is sufficiently high due to magnetization already caused by the permanent magnet 70 alone, so that the inner tube 64b is already held in the defined angular position without an electromagnet. When another angular position is to be assumed, a "pole reversal" is brought about as a result of the connection of the electromagnet by an oppositely directed magnetic flux, and the inner tube 64b rotates into the new desired position.

In the cross-sectional illustration according to FIG. 3E, an alternative design variant with, overall, three pairs of poles 74 is illustrated, with the result that three discrete angular positions are defined. The third angular position here defines an angular position in which the residual plug is taken over again at a defined location from the riveting unit 6 after the setting operation has taken place and is subsequently delivered to the residual plug discharge unit 22. In the exemplary embodiments according to FIGS. 1 and 2, this is not necessary, since the residual plug discharge here takes place rearwardly via a residual plug suckaway.

In the exemplary embodiment illustrated, two guide webs 76 offset rotationally at 180° with respect to one another are provided at the rear end of the hollow piston rod 64 and are mechanically connected firmly to the inner tube 64b. For this purpose, a corresponding element is fastened to the rear side of the hollow piston rod 64. Correspondingly to this, the guide tube 62 is provided with guide grooves 78 formed complementarily thereto (cf. FIG. 3G). These guide grooves 78 are formed in a rear region 80. The guide grooves 78 serve for the axial guidance of the guide tube 62 in a defined angular position, that is to say prevent a rotational movement of the inner tube 64b. In principle, a single guide web 76 is also sufficient. In an alternative not illustrated here, at least one further guide web and, correspondingly to this, a further guide groove are provided for guidance in a further defined angular position.

To control the movement sequence of the rivet feeding unit 8, a control unit 82 is provided, which is illustrated merely diagrammatically in FIG. 3C. This is connected to a sensor, not illustrated in any more detail here, which detects whether, in the catching position of the gripping element 24, the blind rivet 18 has already been shot in. Furthermore, the control unit 82 is connected to the magnet coils 72 for the activation of these. The pneumatic advance of the shaft 64 is also controlled by the control unit 82.

As soon as it is detected that the blind rivet 18 is in the catching position, the magnet coils 72 are given corresponding polarity, in order to transfer the hollow piston rod 64 from the lower angular position into the upper angular position. However, since, in the retracted position in which the blind rivet 18 is caught, the permanent magnet 70 is in a rear region 80, there is still no rotation. At the same time, the pneumatic drive is activated, so that the shaft 64 moves forward in the axial direction 16. As soon as the permanent magnet 70 reaches the region in which the magnet coils 72 are arranged, the magnetically controlled rotational movement takes place up to a defined rotary position in which the blind rivet 18 is located in front of the mouthpiece 28 of the setting unit 6. Since the magnet coils 72 are positioned at a fixed location, the rotational movement only ever takes place in the extended position at the predetermined rotary position. In the next step, the blind rivet 18 is introduced with its plug into the mouthpiece 28 by being moved back axially. In this case, the hollow piston rod 64 is guided in a defined manner in the axial direction 16 in a second angular position by further guide webs, not illustrated here.

The invention claimed is:

1. A feeding unit for feeding a fastening element to a treatment unit of a machine tool, the feeding unit comprising:

a guide tube;

a rotary element mounted within said guide tube and being rotatable about an axial direction, said rotary element being axially displaceable and telescopically guided in said guide tube, said rotary element having a first end and a second end opposite said first end;

a permanent magnet fixed on said rotary element at said second end of said rotary element;

said guide tube having magnet coils disposed thereon, said magnet coils being disposed such that during an axial displacement of said rotary element, said permanent magnet being axially displaceable to an axial position of said magnetic coils for providing a magnetic force producing a torque on said rotary element to rotate said rotary element; and a gripping element for automatically taking-up of the fastening element from a supply unit and automatically feeding the treatment unit, said gripping element disposed on said rotary element at said first end.

2. The feeding unit according to claim 1, wherein said rotary element is rotatable between at least two defined angular positions corresponding to a first rotary position for a take-over of the fastening element from the supply unit and to a second rotary position for transferring the fastening element to the treatment unit.

3. The feeding unit according to claim 2, wherein a third defined angular position is provided and corresponds to a third rotary position for a take-over of a residual element from the treatment unit.

4. The feeding unit according to claim 1, wherein said rotary element is displaceable pneumatically in the axial direction.

5. The feeding unit according to claim 1, wherein said rotary element is configured as a double tube with an outer tube and an inner part.

6. The feeding unit according to claim 5, wherein said outer tube is configured to be only axially displaceable and said inner tube is configured to carry out rotational movement.

7. The feeding unit according to claim 6, wherein said outer tube is sealed off with respect to said guide tube to define a pneumatic cylinder.

8. The feeding unit according to claim 1, wherein said guide tube has a rear region and a positive radial guide disposed in said rear region said rotary element being movable out said rear region by an axial movement from a retracted position into a front rotary position.

9. The feeding unit according to claim 8, further comprising a control unit for activating said electromagnet when said rotary element is still in said rear region.

10. The feeding unit according to claim 1, wherein the fastening element is a rivet and the treatment unit is riveting unit and the feeding unit feeds the rivet to the riveting unit.

11. A method for feeding a fastening element to a treatment unit, which comprises the steps of:

providing the feeding unit according to claim 1;

gripping the fastening element with the gripping element; and rotating the gripping element into a position in front of the treatment unit by generating a magnetic torque acting on the rotary element and causing a rotational movement of the rotary element.

12. The method according to claim 11, wherein the fastening element is a rivet and the treatment unit is a riveting unit.

* * * * *